United States Patent [19]  
Hollins

[11] 4,016,776  
[45] Apr. 12, 1977

[54] REMOTELY CONTROLLED EXTERNALLY MOUNTED MOTOR VEHICLE MIRROR

[76] Inventor: Jesse R. Hollins, 40 Stoner Ave., Great Neck, N.Y. 11021

[22] Filed: Aug. 22, 1975

[21] Appl. No.: 606,795

[52] U.S. Cl. .............................. 74/501 M; 74/526
[51] Int. Cl.² ......................................... F16C 1/12
[58] Field of Search ....................... 74/501 M, 526

[56] References Cited

UNITED STATES PATENTS

| | | | |
|---|---|---|---|
| 3,238,800 | 3/1966 | McCord | 74/501 M X |
| 3,476,464 | 11/1969 | Clark | 74/501 M X |
| 3,550,456 | 12/1970 | Pringle | 74/501 M |
| 3,625,597 | 12/1971 | Jones | 74/501 M X |

Primary Examiner—Samuel Scott  
Assistant Examiner—F. D. Shoemaker  
Attorney, Agent, or Firm—Kirschstein, Kirschstein, Ottinger & Frank

[57] ABSTRACT

An improved remotely controlled externally mounted motor vehicle mirror includes a mirror assembly having a housing which is rigidly affixed to a motor vehicle. A movable mirror element is movably positioned within the housing. The horizontal and vertical positions of the movable mirror element within the housing can be selectively adjusted by a control lever within the motor vehicle so that a driver of the motor vehicle can view the area to the left and rear of the motor vehicle. A vertical slide plate and a horizontal adjustment screw are provided to establish a reference position for the control lever and consequently, the movable mirror element in which the movable mirror element has a certain vertical and horizontal orientation. The driver, by manipulating the control lever, can change the orientation of the mirror element, with the vertical slide plate and horizontal adjustment screw permitting the control lever to be readily returned by the driver to the reference position resulting in the movable mirror element returning to the corresponding orientation.

8 Claims, 6 Drawing Figures

REMOTELY CONTROLLED EXTERNALLY MOUNTED MOTOR VEHICLE MIRROR

BACKGROUND OF THE INVENTION

1. Field of the Invention

Improved apparatus for controlling the position of a remotely controlled externally mounted mirror for a motor vehicle.

2. Description of the Prior Art

Many motor vehicles have a remotely controlled externally mounted mirror on the outside of the driver door. The remotely controlled externally mounted mirror is controlled by a lever associated with a swivel member. the swivel member is mounted in a swivel joint assembly in a convenient position on the upper section of the door. Affixed to the swivel member is the lever which enables the swivel member to be moved as the lever is manually moved.

Three cables are affixed at one end to the swivel member and at the other end to the externally mounted mirror whereby movement of the swivel member results in movement of the mirror. The cables extend from the swivel member below the window well in the door and up along the outside of the window well to the mirror. Consequently, when the window in the driver door is lowered it does not interfere with the operation of the cables controlling the position of the remotely controlled externally mounted mirror.

The remotely controlled externally mounted mirror as just described is efficient in operation but has one specific drawback. Specifically, the remotely controlled externally mounted mirror can be adjusted with little difficulty by the driver while the motor vehicle is stationary by a trial and error technique. Since the motor vehicle is stationary there is no safety hazard created by the driver looking at the remotely controlled externally mounted mirror and not looking at the road. However, when the motor vehicle is moving certain problems often arise in conjunction with the use of the remotely controlled externally mounted mirror. A typical example of one such problem is when the driver is on an entrance way leading to a highway. As is usual, the entrance way is angular or curved to the highway and for the driver to see trailing traffic on the highway it is necessary for him to turn his head sufficiently (which he usually cannot do) or adjust the remotely controlled externally mounted mirror to a position so that he can see trailing cars on the highway immediately adjacent to the entrance way. Once the driver is on the highway (if the mirror was adjusted to enter the highway), it is necessary to readjust the remotely controlled externally mounted mirror by manipulating the control lever therefore so that the driver can see cars in the lane immediately to the left of him and trailing him. In order to make this adjustment to the remotely controlled externally mounted mirror, it is necessary for the driver to view the mirror while it is manipulated to the desired position taking his eyes off the road which of course is undesirable. Until the remotely controlled externally mounted mirror is correctly positioned, it is necessary for the driver to take his eyes off the road thereby increasing the chance of an accident.

SUMMARY OF THE INVENTION

1. Purposes of the Invention

It is an object of the present invention to provide an apparatus for controlling the position of a remotely controlled externally mounted motor vehicle mirror.

Another object of the present invention is to provide apparatus for controlling the position of a remotely controlled externally mounted motor vehicle mirror wherein the adjusting of the mirror to a desired position can be controlled by the motor vehicle driver without the need for the driver to look at the mirror as he is adjusting the position thereof.

Still another object of the present invention is to provide apparatus for controlling the position of a remotely controlled externally mounted motor vehicle mirror wherein a desired position of said mirror can be selected and the mirror placed in said desired position without the driver having to view said mirror to place the mirror in said position.

A further object of the present invention is to provide an improved remotely controlled externally mounted motor vehicle mirror which is reliable in operation and economical in manufacture.

Other objects of the invention will, in part, be obvious and, in part, be pointed out hereinafter.

2. Brief Description of the Invention

According to the present invention, the foregoing as well as other objects are achieved by having a swivel member in a swivel joint in the door adjacent the driver of a motor vehicle. Three cables are provided with each of said cables at one end affixed to the swivel member. Each of said cables at the other end is affixed to the remotely controlled externally mounted mirror wheieby manipulation of the swivel member results in the cables adjusting the position of the mirror. A hand operated lever is provided which extends away from the inside surface of the door adjacent the driver of the motor vehicle. Said lever is affixed to said swivel member and can be manipulated by the driver thereby manipulating the swivel member and varying the position of the remotely controlled externally mounted mirror.

A vertical slide plate is provided which is constrained from rotating. A first regulating screw upon being rotated causes the slide plate to be lowered or raised. The slide plate upon being raised a certain amount abuts the lever and further raising of the slide plate causes said lever to move in conjunction therewith. A horizontal control adjustment screw is provided, which is threaded through said slide plate. Upon said horizontal control adjustment screw being rotated a sufficient amount the screw abuts the lever and causes said lever to move in a horizontal direction in conjunction therewith.

In normal use with the motor vehicle stationary the driver will manipulate the lever so that the remotely controlled externally mounted mirror is in a first position so that the driver of the motor vehicle can look at said mirror to view trailing traffic in the lane immediately to the left of the motor vehicle. This adjustment will be governed by the driver's height and to where he sits in his driving position.

The vertical slide is then adjusted by appropriate rotation of the first regulating screw until the slide plate abuts the lever. In a similar fashion the horizontal control adjustment screw is adjusted until it abuts the lever. Now a reference is provided so that the lever can be manipulated until it abuts the slide plate and horizontal control adjustment screw whereby the remotely controlled externally mounted mirror is in the first position.

If the driver finds it necessary to adjust the remotely controlled externally mounted mirror so as to view traffic ten, twenty or thirty feet to his left and to the rear of his motor vehicle, such as when on an entrance approaching a highway, the lever is moved along the slide plate until the desired position of the mirror is obtained. This can be done rapidly since the lever will only have to be moved horizontally, the vertical position fixed along the slide plate. Consequently, the driver's eyes will leave the road for a very brief period of time.

After the driver's vehicle enters onto the highway he can restore the mirror to the first position merely by sliding the lever along the vertical slide plate until it abuts the horizontal control adjustment screw. The driver can do this without having to look at the mirror overcoming a substantial drawback with prior art remotely controlled externally mounted mirrors.

The invention accordingly consists in the features of construction, combination of elements, and arrangement of parts which will be exemplified in the remotely controlled externally mounted mirror hereinafter described and of which the scope of application will be indicated in the appended claims.

BRIEF DESCRIPTION OF THE DRAWINGS

In the drawings where in like parts are shown in the different figures with the same reference numbers.

DESCRIPTION OF THE PREFERRED EMBODYMENT

Figure 1:
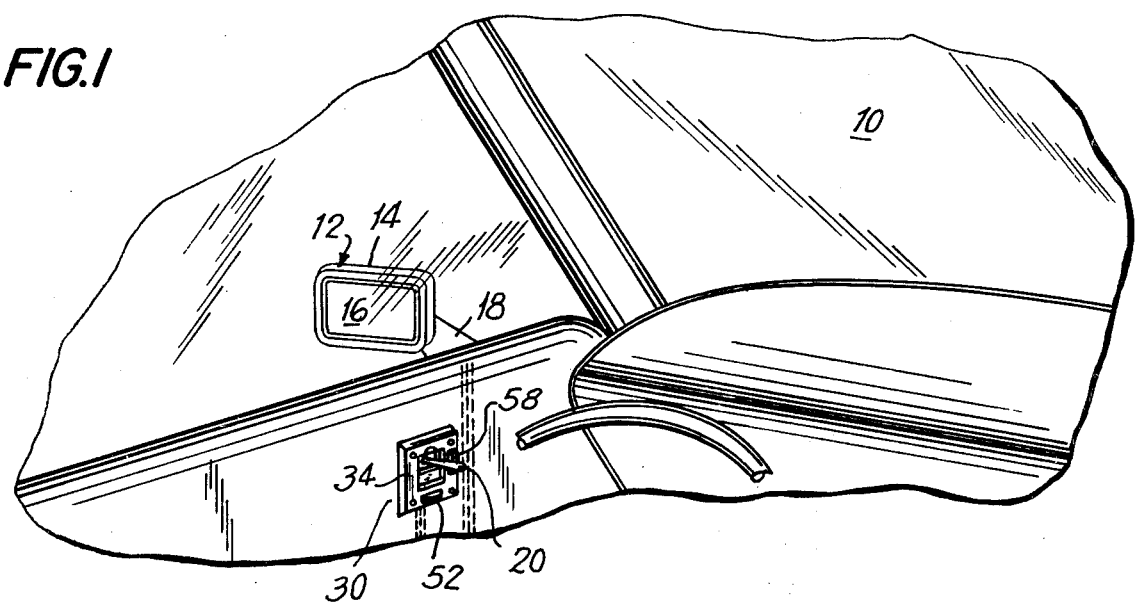
FIG. 1 is a perspective view of a portion of a motor vehicle, the remotely controlled externally mounted mirror therefore and the control lever for said mirror.

In FIG. 1 of the drawings a motor vehicle 10 is illustrated which may be a passenger motor vehicle or other type motor vehicle. The specific structure of the motor vehicle in no way forms a part of the present invention.

As can be seen in FIG. 1 motor vehicle 10 has mounted on the outside surface of the door adjacent the driver of the motor vehicle a remotely controlled externally mounted mirror assembly 12 which includes a housing 14. Mounted within housing 14 is a mirror 16. Housing 14 is affixed to the door adjacent the driver by an arm 18.

Figure 5:
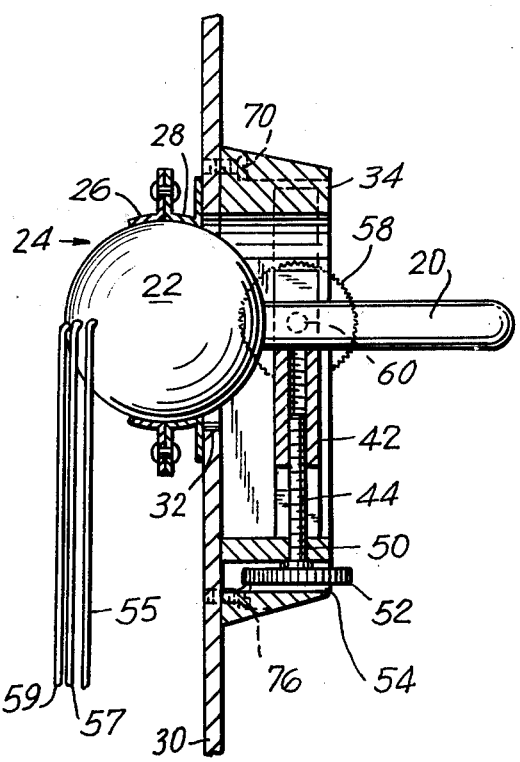
FIG. 5 is a sectional view taken substantially along the line 5—5 of FIG. 4.
Figure 6:
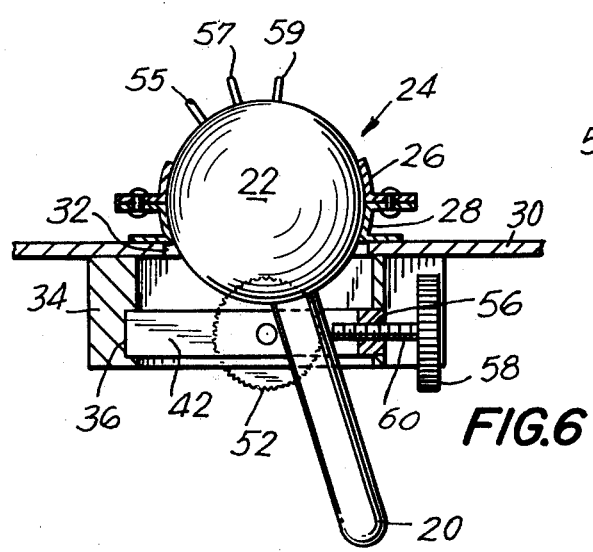
FIG. 6 is a sectional view taken substantially along the line 6—6 of FIG. 4.

Affixed to the inside of the door adjacent the driver of the motor vehicle is the apparatus for controlling the position of mirror 16. Said apparatus can best be seen in FIGS. 4, 5 and 6. A control lever 20 is provided and is affixed to a swivel ball 22 (switch member). Spherical ball 22 is rotatable in a (swivel joint) ball joint 24 which is stationary. Ball joint 24 is formed by spherical annular plate 26 which confines the movement of spherical ball 22 as will hereinafter be described. Spherical plate 28 cooperates with spherical metal plate 26 to enable spherical ball 22 to rotate but not have any other type of movement. Spherical plates 26 and 28 include flanges which are riveted to each other as can be clearly seen in the drawings. Spherical plate 28 is affixed to the internal door frame 30 of motor vehicle 10. Spherical plate 28 includes an opening 32 through which ball 22 partially extends.

Affixed to internal door frame 30 is a slide plate frame member 34. Slide plate frame member 34 includes a channel 36 at one end thereof and a second channel 38 at the opposite end thereof. An opening 40 is formed in slide plate frame member 34 for a reason that will soon be readily apparent. Slidable within channels 36 and 38 is a vertical slide plate 42. Vertical slide plate 42 has a threaded opening 44 which extends through a portion of the length thereof. An opening in frame member 34 is in registry with opening 44. A vertical slide plate regulating screw 46 includes a shaft 48 which is threaded into threaded opening 44. Shaft 48 extends through a clearance hole 50 in slide plate frame member 34. Affixed to one end of shaft 48 is a screw head 52 which is located in an opening 54 in frame slide plate member 34. Screw head 52 upon being rotated causes slide plate 42 to be raised and lowered as the case may be.

Affixed to spherical ball 22 are three cables which are identified in the drawings by reference numerals 55, 57 and 59. The cables run along the inside surface of the door adjacent the window well, beneath or alongside of the window well and along the outside surface of the door up to arm 18 where they are connected by appropriate joining means to mirror 16 whereby the position of the mirror is controlled by manipulation of the cables. This is conventional and per se does not form a part of my invention.

Figure 4:
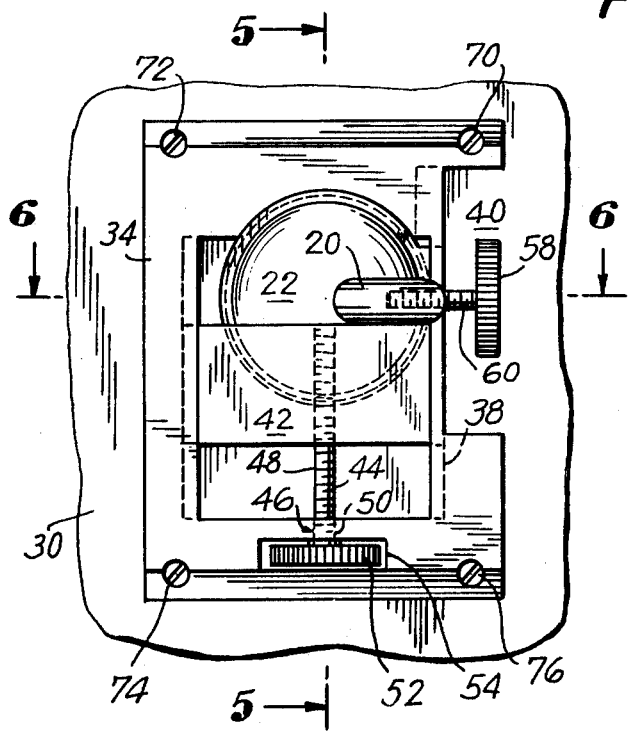
FIG. 4 is a plan view partially broken looking at the inside of a door on a motor vehicle having a remotely controlled externally mounted mirror of the present invention.

A horizontal control adjustment screw 60 is provided and extends through a threaded opening in vertical slide plate 42, said threaded opening being identified by the reference numeral 56. Attached to the right end of horizontal control adjustment screw 60 as viewed in FIG. 4 is a screw head 58 which is located in opening 40.

Figure 3:
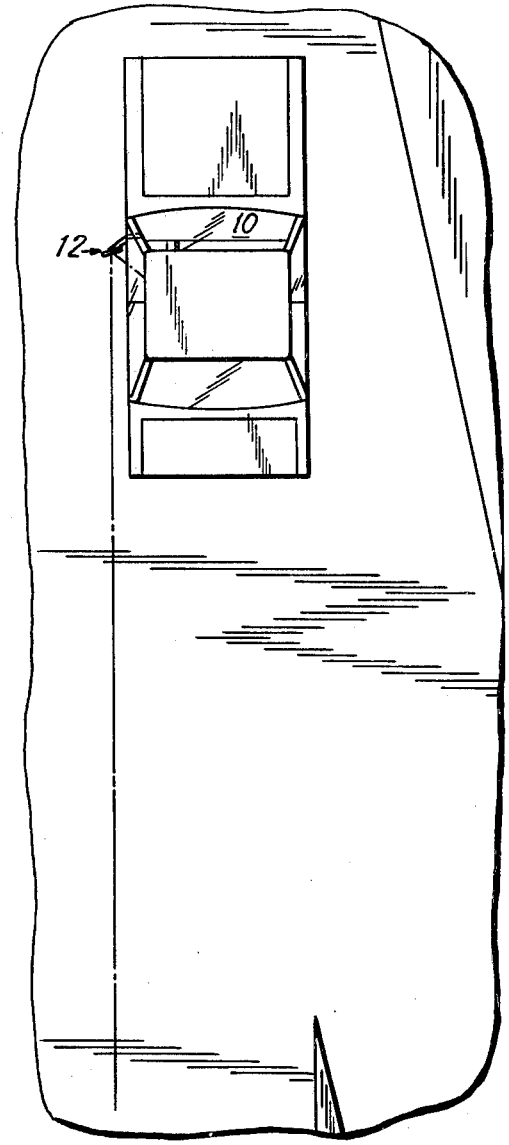
FIG. 3 is a top plan of view showing how a remotely controlled externally mounted mirror is adjusted by a driver of a motor vehicle when travelling along a highway or other roadway.

In normal use with the motor vehicle stationary the driver will position mirror 16 so that he can view trailing traffic in the lane immediately to the left of him as shown in FIG. 3. This will be done by manipulating lever 20 until mirror 16 is in its desired position. The exact position for a specific driver will depend on the driver's height and where he sits. After mirror 16 has been so positioned screw head 52 is rotated causing screw shaft 48 to rotate. Vertical slide plate 42 will be raised until it contacts lever 20. In a similar fashion screw head 58 will be rotated until screw shaft 60 touches lever 20. A reference position for the lever will now be established wherein mirror 16 will be positioned for the driver so that he can view trailing traffic in the lane immediately to his left.

Figure 2:
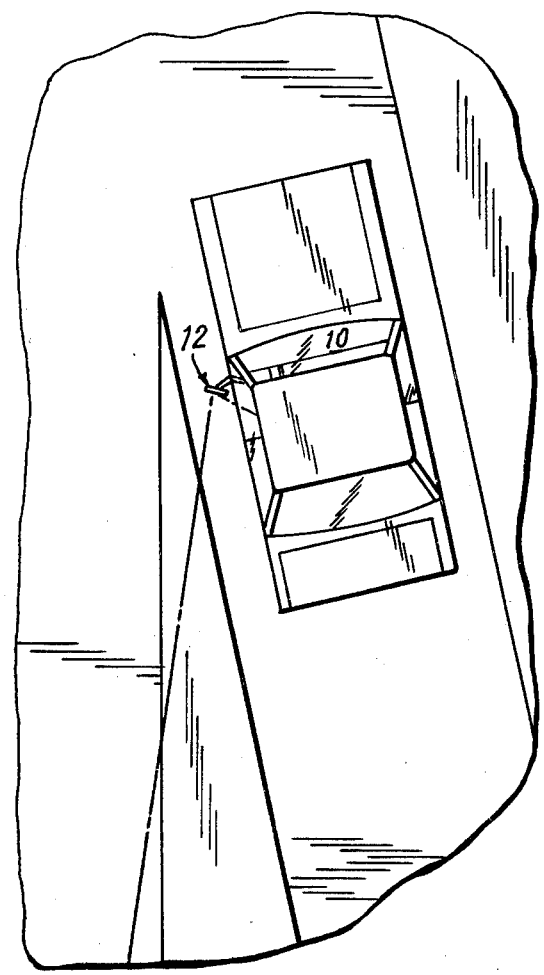
FIG. 2 is a plan top view showing how the remotely controlled externally mounted mirror is adjusted by a driver of the motor vehicle as his motor vehicle is on an entrance way approaching a highway.

If the driver should enter onto an entranceway to a highway, such as shown in FIG. 2, it is necessary to swing the horizontal position of mirror 16 so as to view traffic on the highway. The adjustment to the mirror can be made in a rapid safe fashion. Lever 20 will be moved along vertical slide plate 42 until the proper position of the mirror is obtained to enable the driver to view trailing traffic on the highway. The driver will not have to concern himself with the vertical adjustment of lever 20 since the position vertically of the lever will be determined by its sliding along slide plate 42. Since the driver will only have to concern himself with the horizontal position of the lever he can do this in a relatively brief period of time by glancing at mirror 16 and moving the lever until the desired field of view is obtained. This can be done in a safe and rapid fashion minimizing safety hazards.

When the driver wishes to return the mirror so his field of view is that shown in FIG. 3 all that is necessary is for the driver to move lever 20 along vertical slide plate 42 until it abuts screw 60. The driver can do this without even looking at the mirror and therefore he can continue to view the road. The chance of an accident is greatly reduced since the driver will not have to take his eyes away from viewing the road ahead as he is driving.

It is clear that the principles of the present invention can be incorporated in a remotely controlled externally mounted mirror that is located on the outside of the door opposite the driver door. In this case, the apparatus for positioning of the mirror mounted on the outside of the front door opposite the driver door may be secured to said front door or elsewhere.

It thus will be seen that there is provided remotely controlled externally mounted motor vehicle mirror which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. An improved remotely controlled externally mounted motor vehicle mirror comprising a motor vehicle, a door adjacent to where the driver of the motor vehicle sits, a mirror assembly including a mirror affixed to the outside of said door, means stationary with said door for selectively adjusting the position of said mirror including a member, and means for placing said selective adjusting means in a desired reference position including means for limiting the movement of said member in a vertical and horizontal direction whereby said mirror can be placed in a desired reference position.

2. An improved remotely controlled externally mounted motor vehicle mirror according to claim 1 wherein said member is a lever, a swivel member, a swivel joint in which said swivel member is rotatable, said lever controlling the rotation of said swivel member, means affixed to said mirror and said swivel member whereby when said swivel member is rotated in said swivel joint by said lever the position of said mirror is correspondingly varied.

3. An improved remotely controlled externally mounted motor vehicle mirror according to claim 1 wherein said limiting means includes a horizontal control element, said horizontal control element limiting the movement of said member in one horizontal direction, and means for controlling the position of said horizontal control element relative to said member.

4. An improved remotely controlled externally mounted motor vehicle mirror according to claim 1 and further including a frame means, wherein said limiting means includes a vertical control element slidably positioned within said frame means, said vertical control element constrained from rotating within said frame means, and means for controlling the position of said vertical control element within said frame means to thereby limit the movement of said member in a vertical direction.

5. An improved remotely controlled externally mounted motor vehicle mirror according to claim 4 wherein said frame means is affixed to said door, said vertical control element is a vertical slide plate, a first regulating screw, said frame means having a vertical opening therein, said first screw extending through said vertical opening, and a first threaded opening in said vertical slide plate, said first screw in threaded engagement with said first threaded opening, so that rotation of said first regulating screw in one direction causes said vertical slide plate to move upward within said frame means, and rotation of said first regulating screw in the opposite direction causes said vertical slide plate to move downward within said frame means.

6. An improved remotely controlled externally mounted motor vehicle mirror according to claim 5 wherein said limiting means includes a second regulating screw adapted to limit the movement of said member in one horizontal direction, said vertical slide plate having a second threaded opening, said second regulating screw extending through said second threaded opening and in threaded engagement therewith so that the position of said second regulating screw relative to said member can be controlled.

7. An improved remotely controlled externally mounted motor vehicle mirror in accordance with claim 2 wherein said swivel member is a ball, and said swivel joint is a ball joint affixed to said door in which said ball is rotatable.

8. An improved remotely controlled externally mounted motor vehicle mirror comprising a mirror assembly including a movable mirror element within a housing, said housing rigidly affixed to said motor vehicle, means within said motor vehicle for selectively adjusting the horizontal and vertical positions of said movable mirror element within said housing, and means associated with said adjusting means and said movable mirror element for establishing a reference position for said selectively adjusting means and for said movable mirror element in which position said movable mirror element has a certain vertical and horizontal orientation within said housing, said means for establishing a reference position permitting said movable mirror element to be placed in an orientation other than that of said reference position through manipulation of said selectively adjusting means and permitting said movable mirror element to be returned to said orientation in said referenced position through manipulation of said selectively adjusting means.

* * * * *